No. 767,435. Patented August 16, 1904.

UNITED STATES PATENT OFFICE.

ARTHUR W. PERKINS, OF RUTLAND, VERMONT.

COMPOSITION FOR BLOCKS.

SPECIFICATION forming part of Letters Patent No. 767,435, dated August 16, 1904.

Application filed December 19, 1903. Serial No. 185,813. (No specimens.)

*To all whom it may concern:*

Be it known that I, ARTHUR W. PERKINS, a citizen of the United States of America, and a resident of Rutland, in the county of Rutland and State of Vermont, have invented certain new and useful Improvements in Composition for Blocks, of which the following is a specification.

This invention relates to compositions for the manufacture of locomotive blocks or bricks, fire-bricks, stove-linings, enamelers' mufflers, gas-retorts, baker's-oven tiles, and any and all other purposes where bricks, blocks, tiles, &c., are to be subjected to very intense and quickly-varying temperatures. It has for its objects, among others, to produce a block, brick, or tile, &c., that will be capable of standing more heat and wear longer and withstand severe and continuous jar, be stronger and less liable to be effected by sudden changes of temperature, and at the same time provide for a great saving to the manufacturer of this class of articles.

Other objects and advantages of the invention will hereinafter appear and the novelty will be particularly pointed out in the appended claims.

The mixture that I have found best adapted for all purposes is substantially as follows: three hundred pounds of fire-clay, one hundred pounds of fire-brick or burnt (calcined) fire-clay, one hundred pounds of fire-sand, one hundred pounds of mica-sand, fifty pounds of mineral wool, one hundred pounds of asbestos, preferably fiber.

In lieu of the fire-brick or burnt (calcined) fire-clay I may use any other suitable "grog."

It is evident that the above-named proportions are not in all instances essential and may be varied to suit the special purpose or use to which the block, brick, or tile is to be put. For instance, where the product is to be subjected to quick-varying temperatures less plastic clay would be used and more ground brick, calcined clay, or other grog. Where the temperature is to be practically even, more plastic clay and less grog will be employed.

Where the bricks are to be subjected to a severe or continuous jar, as in a locomotive, more asbestos and mineral wool would be used, making the bricks or blocks stronger and of a closer texture.

The mineral wool and asbestos fiber in this class of materials has practically the same effect as hair in plastering-mortar, doing away with the cracks that otherwise would appear in drying and burning the bricks or blocks or tiles, making it necessary to throw away many of them, causing a serious loss to the manufacturer. This is avoided by the use of my composition.

From the above it will be evident that I do not intend to restrict myself to the exact proportions above specified, but reserve the right to vary the same in accordance with the character of fire-clay product desired.

What I claim as new is—

1. A composition for the purpose described composed of fire-clay, a "grog," fire-sand, mineral wool and asbestos.

2. A composition for the purposes described, consisting of fire-clay, a "grog," fire-sand, mica-sand, mineral wool and asbestos.

3. A composition for the purpose described, consisting of fire-clay, fire-brick, fire-sand, mica-sand, mineral wool and asbestos in substantially the proportions specified.

4. As an improved article of manufacture, a block, brick or tile, composed of fire-clay, fire-brick, fire-sand, mica-sand, mineral wool and asbestos.

5. As an improved article of manufacture, a brick, block or the like having as an essential thereof, mineral wool, a "grog," asbestos and fire-clay.

Signed by me at Rutland, Vermont, this 15th day of December, 1903.

ARTHUR W. PERKINS.

Witnesses:
JOHN C. FLYNN,
M. LLOYD MAXWELL.